Oct. 21, 1952 N. JOSEPH 2,614,663

BRAKE OPERATING MECHANISM

Filed Sept. 13, 1949

INVENTOR.
NATHAN JOSEPH
BY
Lynn Latta
—ATTORNEY—

Patented Oct. 21, 1952

2,614,663

UNITED STATES PATENT OFFICE 2,614,663

BRAKE OPERATING MECHANISM

Nathan Joseph, Los Angeles, Calif.

Application September 13, 1949, Serial No. 115,361

4 Claims. (Cl. 188—78)

This invention relates to the operating mechanism of a hydraulic type brake system for automobiles. It is directed particularly to the brake system of a Chevrolet automobile. The general object of the invention is to provide, in the operating mechanism of such a brake system, a means for imparting to the system the "feel" of a booster operated brake system. Specifically, the invention aims to provide means including a lost motion connection, for effecting a limited amount of response by the brake shoes to the "wrapping" tendency which arises from the contact of the brake shoe with the brake drum.

A further object of the invention is to accomplish the foregoing in an extremely simple and inexpensive manner by the provision of a modification of a single element in a conventional brake mechanism, which single element may be manufactured quite inexpensively.

Other objects will become apparent in the ensuing specifications and appended drawings in which.

Figure 1:
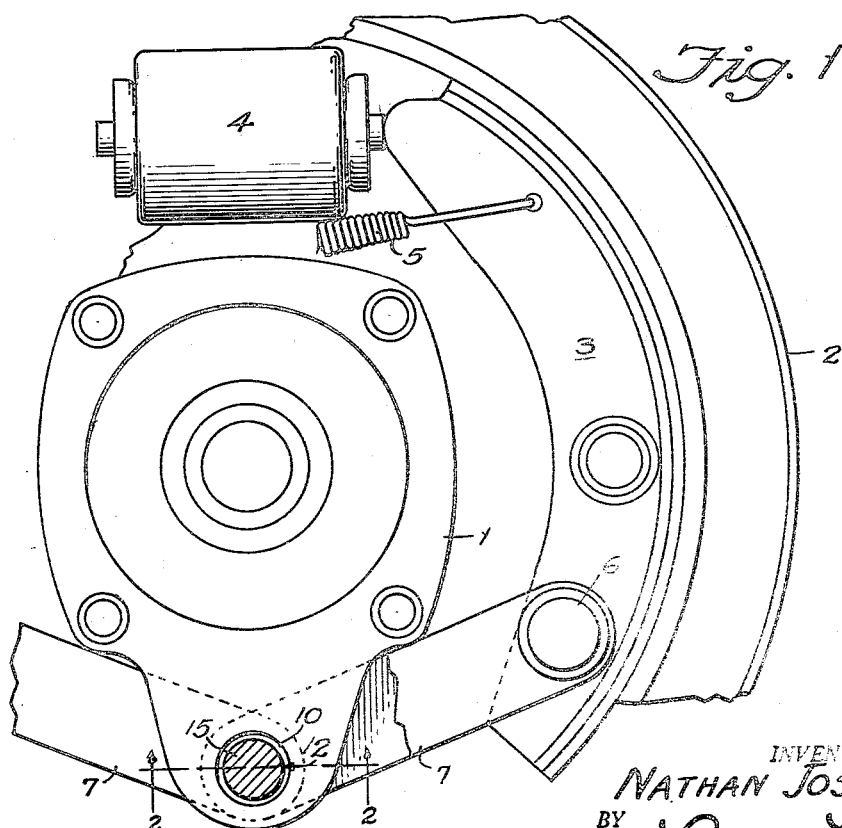
Fig. 1 is a sectional view of a portion of a Chevrolet brake system incorporating the invention therein.

Referring now to the drawing in detail, I have shown in Fig. 1 that portion of a Chevrolet brake mechanism to which the invention is applied. The numeral 1 indicates the conventional anchor plate which is bolted to the brake backing plate 2 of all Chevrolet hydraulic brake systems. Brake applying movement is transmitted to brake shoes 3 at one end thereof, from hydraulic wheel cylinder 4, operating against the yielding resistance of retracting springs 5. The reaction of the brake shoes to the braking operation is taken by reaction links 7, connected to the other ends of shoes 3 by pivots 6, and anchored to plate 1 by an anchor pin that is snugly journalled in an opening 10 in plate 1 and in openings 11 in links 7, thus providing a pivotal connection without play.

The present invention involves the discovery that by providing a limited amount of play between links 7 and anchor plate 1, it is possible to impart to the brake operating system the "feel" and some of the action of booster operated brakes. The lost motion provides for a limited amount of free movement of the links 7 to accommodate a wrapping action of the brake shoes on the brake drum.

Figure 2:
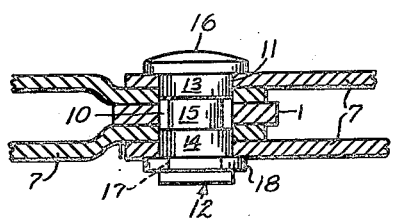
Fig. 2 is a detail sectional view thereof taken on the line 2—2 of Fig. 1.

In the preferred form of the invention shown in Figs. 1 and 2, this lost motion is provided for in a very simple and inexpensive manner by substituting for the conventional pivot pin, a pivot pin 12 which has portions 13 and 14 snugly fitting the openings 11 in links 7 and, between the portions 13 and 14, a portion 15 of reduced diameter which extends, with clearance, through the opening 10 in anchor plate 1. The reduced portion 15 is defined by an annular groove which is somewhat wider than the thickness of plate 1, so that the extremities of pin portions 13 and 14 will clear the plate 1. Pin 12 has a conventional head 16 and, at its other end, a groove 17 in which a conventional snap ring 18 is seated, for securing the parts in assembly. Any other securing means, such as a cotter pin, could be employed instead of the snap ring 18.

Figure 3:
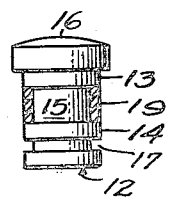
Fig. 3 is a detail sectional view of a modification of the invention.

Fig. 3 illustrates a modified form of the invention in which the annular groove between pin portions 13 and 14 is filled by a sleeve 19 of compressible material such as rubber or neoprene. The sleeve 19 provides a yielding resistance to the relative movement between anchor plate 1 and links 7, which cushions and smooths the wrapping action of the brake shoes.

I claim:

1. A brake operating system including an anchor plate secured to a brake backing plate, a pair of parallel links for transmitting brake shoe reaction to said anchor plate, said anchor plate and links having therein, openings of the same size, and a pivot pin extending through said openings, said pin having, intermediate its ends, an annular groove that is wider than the thickness of said anchor plate and embraces the planes of the respective sides of said anchor plate, said pin including, on either side of said groove, pin portions which fit snugly in the openings in said links and said annular groove defining, between said portions, a reduced central portion which extends through the opening in said anchor plate, with peripheral clearance in said anchor plate opening such as to provide for limited lost motion between the links and the anchor plate, thereby providing for limited wrapping action of the brake shoes of the brake.

2. A brake operating mechanism as defined in claim 1, including a compressible sleeve disposed in said annular groove, fitting snugly within the opening in said anchor plate and functioning to cushion the lost motion between said links and said anchor plate.

3. A brake operating system including: an anchor plate; a pair of links for transmitting brake shoe reaction to said anchor plate, said anchor plate and links having therein openings of the same diameter; and a pivot pin having at one end a head, having removable securing means at its other end, having a central annular groove defining a reduced intermediate portion of diameter smaller than that of said openings, said groove being wider than the thickness of said plate, and said pin having, between said groove and its respective ends, a pair of body portions each of a diameter to snugly fit within an opening of a respective link and a length such as to dispose said groove in embracing relation to the planes of the respective sides of said anchor plate, whereby, in the assembled system, said reduced intermediate portion will extend through the opening in said anchor plate and will define, within said anchor plate opening, an annular space providing for lost motion between the links and the anchor plate, thereby to provide for limited wrapping action of the brake shoe of the brake.

4. For a brake operating system including an anchor plate and a pair of links for transmitting brake shoe reaction to said anchor plate, said anchor plate and links having therein openings of the same diameter designed to normally receive a pivot pin snugly fitting all of said openings: an improved pivot pin having at one end a head, having removable securing means at its other end, having a central annular groove defining a reduced portion of a diameter smaller than that of said openings, said groove being wider than the thickness of said plate, said pin having, between said groove and its respective ends, a pair of body portions each of a diameter to snugly fit within an opening of a respective link and of a length such as to dispose said groove in embracing relation to the planes of the respective sides of said anchor plate, whereby said reduced portion will extend through the opening in said anchor plate and will define within said anchor plate opening, an annular space providing for lost motion between the links and the anchor plate, thereby to provide for limited wrapping action of the brake shoes of the brake.

NATHAN JOSEPH.

REFERENCES CITED

The following references are of record in the file of this patent:

UNITED STATES PATENTS

| Number | Name | Date |
|---|---|---|
| 1,908,397 | Andres | May 9, 1933 |
| 2,002,786 | Melling | May 28, 1935 |
| 2,139,083 | Kuiker | Dec. 6, 1938 |
| 2,355,425 | Daniels | Aug. 8, 1944 |
| 2,519,952 | Campbell et al. | Aug. 22, 1950 |